(12) United States Patent
Cazier et al.

(10) Patent No.: US 8,559,973 B2
(45) Date of Patent: Oct. 15, 2013

(54) MODE OF OPERATION BASED ON IMAGE CAPTURE PROFILE

(75) Inventors: Robert P Cazier, Fort Collins, CO (US); Shane D Voss, Fort Collins, CO (US); Jason Yost, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 126 days.

(21) Appl. No.: 13/151,005

(22) Filed: Jun. 1, 2011

(65) Prior Publication Data

US 2012/0309407 A1    Dec. 6, 2012

(51) Int. Cl.
*H04W 4/00*    (2009.01)

(52) U.S. Cl.
USPC .................................... 455/456.1; 455/404.1

(58) Field of Classification Search
USPC ............ 455/404.1, 404.2, 456.1, 456.3, 12.1
See application file for complete search history.

(56) References Cited

U.S. PATENT DOCUMENTS

2010/0004000 A1    1/2010  Chen
2011/0085054 A1*   4/2011  Choi et al. ................. 348/231.3

* cited by examiner

*Primary Examiner* — Sam Bhattacharya
(74) *Attorney, Agent, or Firm* — Chun-Liang Kuo

(57) ABSTRACT

A device to detect a location of a device, identify an image capture profile associated with the location of the device, and modify a mode of operation on the device based on the image capture profile.

20 Claims, 7 Drawing Sheets

MODE OF OPERATION BASED ON IMAGE CAPTURE PROFILE

BACKGROUND

If a user would like to modify a mode of operation of a device, the user can proceed to access input buttons of the device and modify one or more settings of the settings device, if the user relocates to another location, causing the environment and/or the conditions around the device to change, the user can continue to identify which settings to modify based on the environment and conditions around the device. The user can then manually access the settings with the input buttons on a need to need basis. By modifying the mode of operation of the device, the user can control how the device operates and functions to capture images and/or perform additional actions at different locations.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

As a user moves from one location to another, an environment around the user can change. When changing locations, the user may wish to modify a mode of operation of a device, such as an image capture mode, to accommodate for different operating conditions or uses of the device ideal for the environment. An environment can include an Office, a Library, a Movie Theatre, an Art Gallery, a Park, Outdoor Entertainment, and/or a Celebration.

By detecting a location of the device, an image capture profile associated with the location of the device can conveniently be identified. Using the image capture profile, a mode of operation of the device can be modified based on the image capture profile. By modifying the mode of operation based on an image capture profile, components and/or settings of the device can be tailored for different uses of the device based on the location of the device. As a result, a flexible and user friendly experience can be created for a user as the user captures images and/or videos at different locations.

Figure 1:
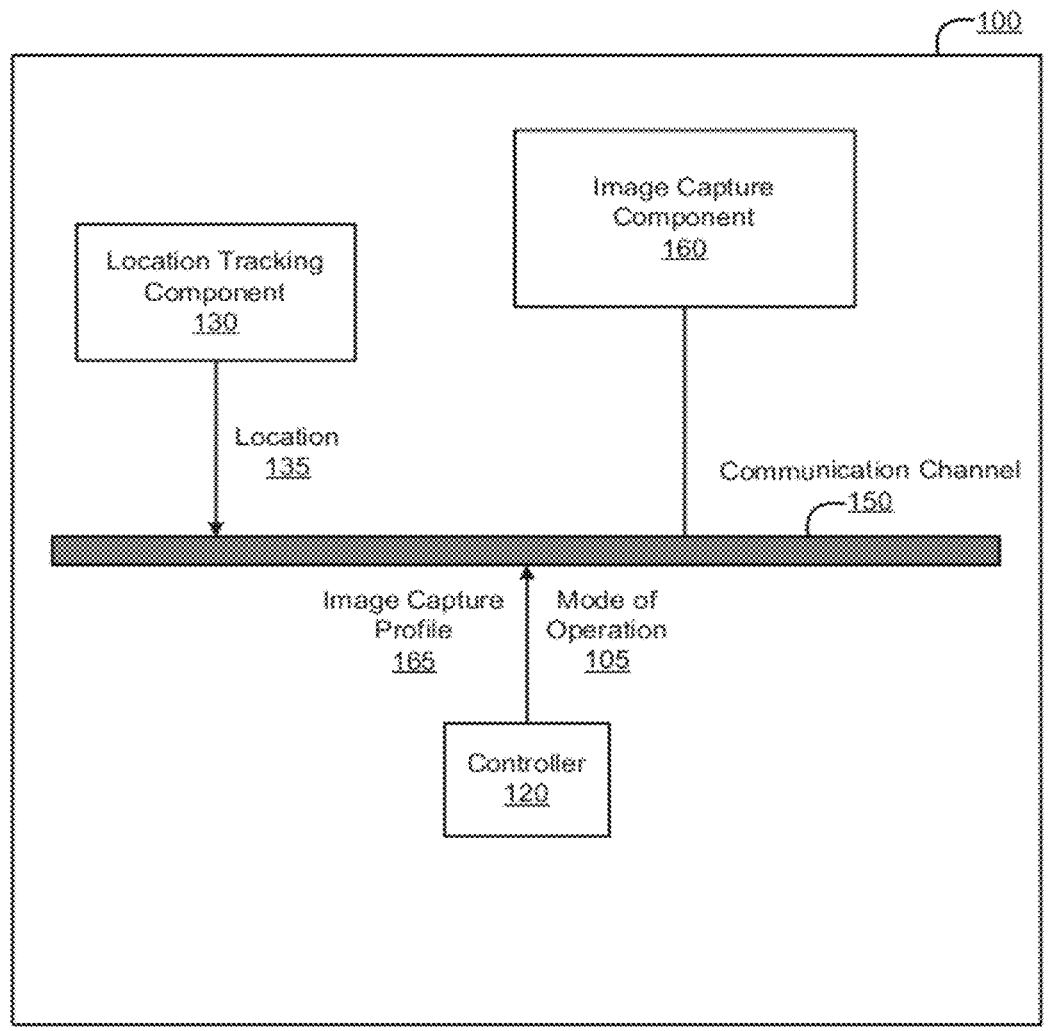
FIG. 1 illustrates a device with an image capture component according to an embodiment.

FIG. 1 illustrates a device 100 with an image capture component 160 according to an embodiment. In one embodiment, the device 100 can be a cellular device, a PDA (Personal Digital Assistant), an E (Electronic)-Reader, a tablet, a camera, and/or the like. In another embodiment, the device 100 can be a desktop, a laptop, a notebook, a tablet, a netbook, an all-in-one system, a server, and/or any additional device which can include an image capture component 160 and a location tracking component 130.

As illustrated in FIG. 1, the device 100 includes a controller 120, a an image capture component 160, a location tracking component 130, and a communication channel 150 for the device 100 and/or one or more components of the device 100 to communicate with one another. In one embodiment, the device 100 includes an image application stored on a computer readable medium included in or accessible to the device 100. In other embodiments, the device 100 includes additional components and/or is coupled to additional components in addition to and/or in lieu of those noted above and illustrated in FIG. 1.

As noted above, the device 100 can include a controller 120. The controller 120 can send data and/or instructions to the components of the device 100, such as the image capture component 160, the location tracking component 130, and/or the image application. Additionally, the controller 120 can receive data and/or instructions from components of the device 100, such as the image capture component 160, the location tracking component 130, and/or the image application.

The image application is an application which can be utilized in conjunction with the controller 120 to manage the device 100 by modifying a mode of operation 105 of the device 100. For the purposes of this application, a mode of operation 105 can include an operation state or activity of the device 100. In one embodiment, the mode of operation 105 is an image capture mode of the device 100. The device 100 is in an image capture mode if an image capture component 170 of the device 100 is enabled and/or if an application of the device 100 is launched which utilizes the image capture component 170.

For the purposes of this application, the image capture component 170 is a hardware component of the device 100 configured to capture visual media as a two-dimensional or a three-dimensional image and/or video. The image capture component 170 can be a camera, a photo sensor, a scanner, and/or any additional device configured to capture images and/or videos.

When modifying a mode of operation 105, the controller 120 and/or the image application can initially detect a location 135 of the device 100 with a location tracking component 130. The location tracking component 130 is a hardware component of the device 100 configured to detect signals from satellites, base stations, and/or cellular towers and provide the signals as location data to the controller 120 and/or the image application. In one embodiment, the location tracking component 130 can be a GPS (global positioning system) receiver and/or a radio device. The controller 120 and/or the image application can use the location data to detect the location 135 of the device 100 by triangulating the location of the device 100 with the signals.

Based on the location 135 of the device 100, the controller 120 and/or the image application can identify an image capture profile 165 associated with the location 135 of the device 100. For the purposes of this application, an image capture profile 165 can be a file or a list which can be used by the controller 120 and/or the image application to modify the mode of operation 105 of the device 100. The image capture profile 165 can list components of the device 100 to enable or disable. Additionally, the image capture profile 165 can list one or more settings to be used for the components of the device 100.

In one embodiment, modifying the mode of operation 105 can include enabling or disabling one or more components of the device 100 and/or modifying a setting of one or more of the components of the device 100. For the purposes of this application, a component of the device 100 can be a hardware component and/or a software component utilized by controller 120 and/or the image application in the mode of operation 105. One or more components can include the image capture component 160, the location tracking component 130, an audio output component, a light source, and/or a motor to provide haptic feedback for the device 100.

By modifying the mode of operation 105 based on the image capture profile 165, the components and/or settings of the device 100 can be modified for different environments and/or conditions as the device 100 is being used in an image capture mode. In one embodiment, if the environment and/or condition of the locations is associated with a secured area, a no use area, and/or a quiet area, one or more components, such as the image capture component 160, the audio output component, and/or the light source can be disabled so that no images or videos can be captured for security reasons. Additionally, no light or noise can be outputted so as not to create disturbances.

In another embodiment, if the environment and/or condition of a location is associated with a social event, outdoor use, and/or a loud area, the image capture profile 165 can list for the image capture component 160, the location tracking component 130, the audio output, the light source, and/or the motor to be enabled and configured for use in the image capture mode.

The image application can be firmware which is embedded onto the controller 120, the device 100, and/or a storage device coupled to the device 100. In another embodiment, the image application is an application stored on the device 100 within ROM (read only memory) or on the storage device accessible by the device 100. In other embodiments, the image application is stored on a computer readable medium readable and accessible by the device 100 or the storage device from a different location. The computer readable medium can include a transitory or a non-transitory memory.

Figure 2:
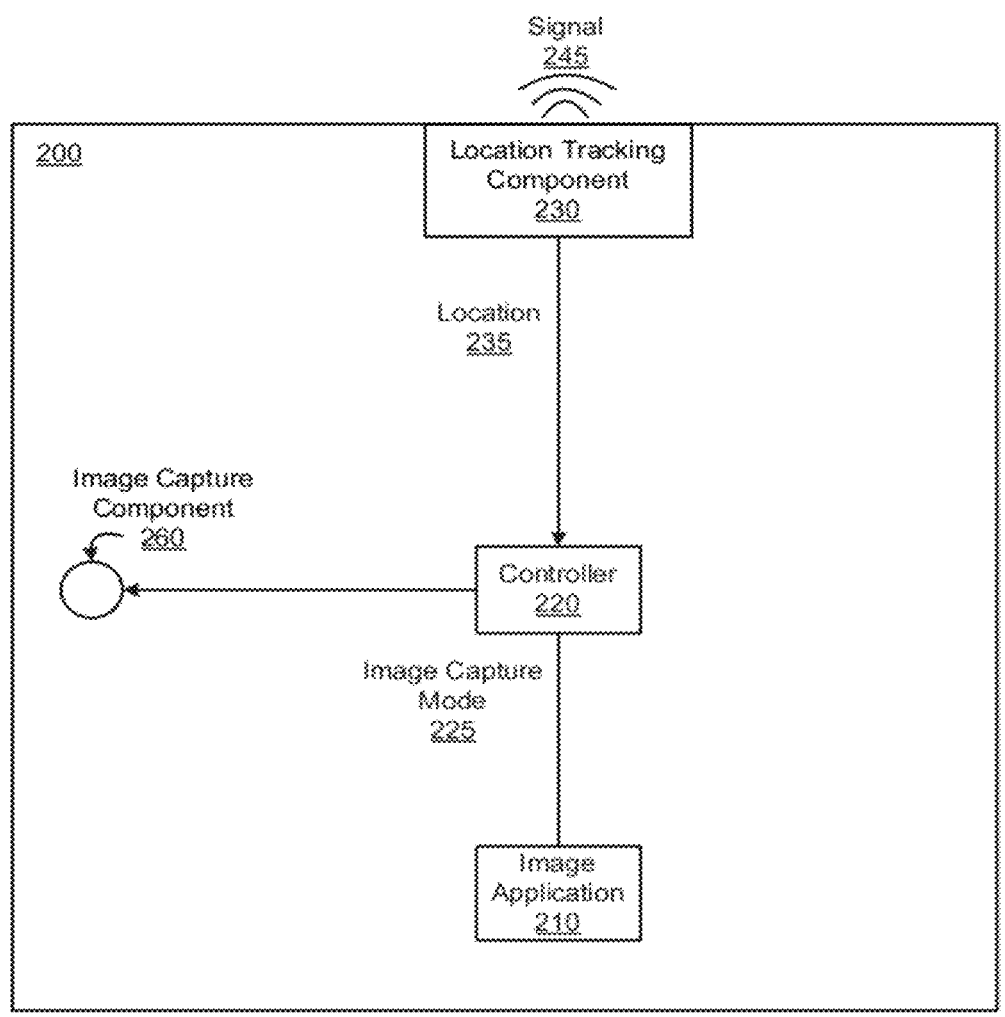
FIG. 2 illustrates a location tracking component detecting a location of a device according to an embodiment.

FIG. 2A illustrates a location tracking component 230 detecting a location 235 of a device 200 according to an embodiment. As noted above and illustrated in FIG. 2A, the location tracking component 230 is a hardware component of the device 200 configured to detect one or more signals 245 from satellites, base stations, and/or communication towers. In one embodiment, the location tracking component 230 can be a GPS (global positioning system) receiver and/or a radio component. One or more of the signals 245 can include communication signals, ranging signals, and/or navigation messages. The detected signals 245 can be passed to the controller 220 and/or the image application 210 as location data.

In one embodiment, the controller 220 and/or the image application 210 can detect the location 235 of the device 200 if the location tracking component 230 detects signals 245 from at least three communication devices, such as satellites, communication towers, and/or base stations. The controller 220 and/or the image application 210 can detect the location 235 of the device 200 by triangulating the position of the device 200 using the signals 245. The location 235 can be represented as a coordinate of the device 200 and/or as a name of a place corresponding to the coordinate. In other embodiment, additional methods can be used to identify the location 235 of the device 200 in addition to and/or in lieu of those noted above.

The location 235 of the device 200 can be detected in response to the device 200 powering on. Additionally, the location 235 can continue to be updated periodically over a period of time. In another embodiment, the controller 220 and/or the image application 210 can detect the location 235 of the device 200 in response to the device entering an image capture mode 225. As noted above, the device 200 is in an image capture mode 225 if an image capture component 260 of the device 200 is enabled and/or if an application of the device 200 is launched which utilizes the image capture component 260.

The image capture component 260 is a hardware component of the device 200 configured to capture visual media as a two-dimensional and a three-dimensional image and/or video. Additionally, the image capture component 260 can be enabled and/or disabled by the controller 220, the image application 210, a user of the device 200, and/or by an application of the device 200. The application can be any software application executable by the controller 220 and/or the image application 210 which utilizes the image capture component 260 to capture images, videos, a view, and/or receives input for the device 200. The application can be locally stored on the device 200 or remotely accessed by the controller 220 and/or the image application 220 from another device.

Figure 3:
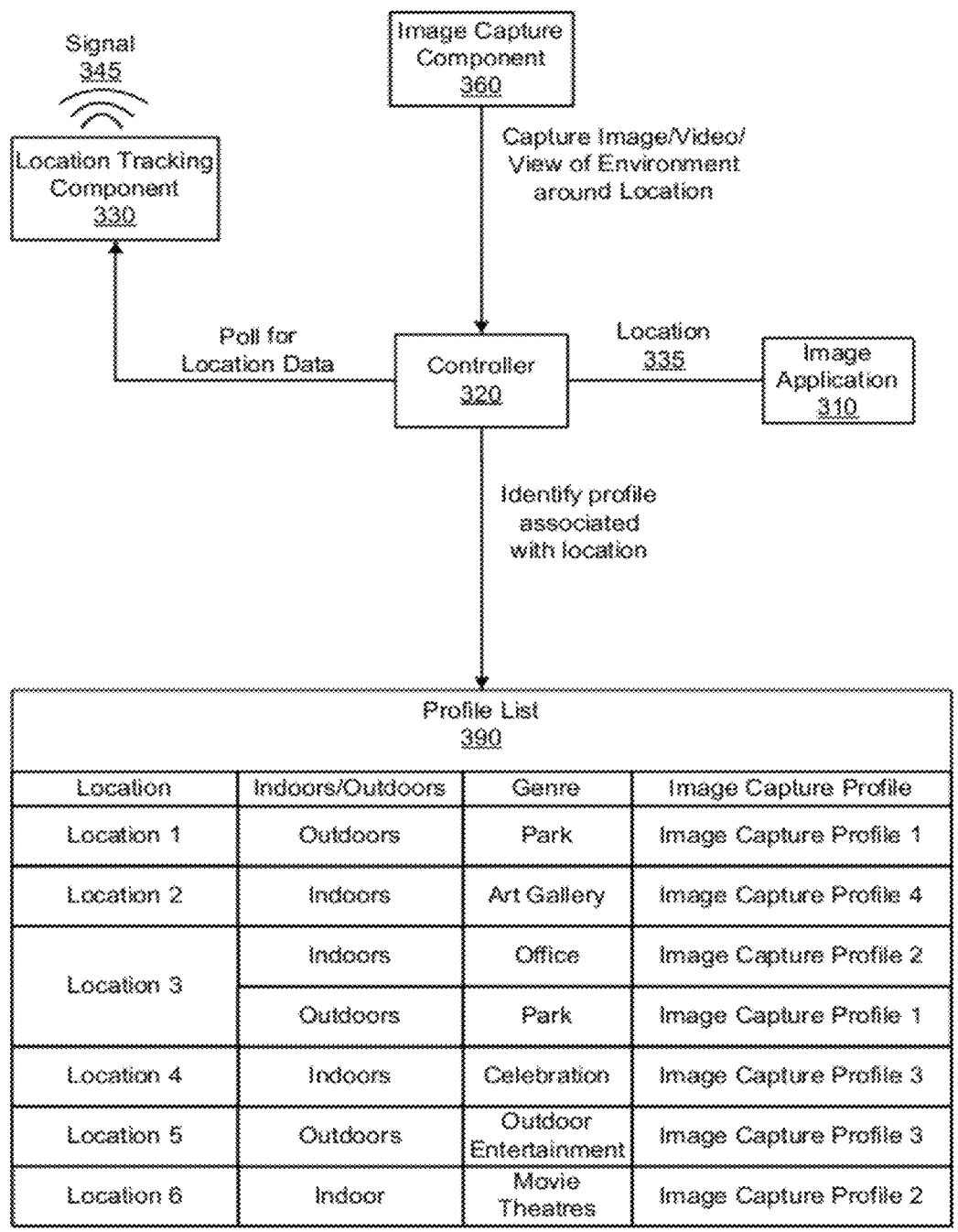
FIG. 3 illustrates a block diagram of an image application identifying an image capture profile for a device according to an embodiment.

FIG. 3 illustrates a block diagram of an image application 310 identifying an image capture profile for the device according to an embodiment. In response to detecting the location 335 with the location data, the controller 320 and/or the image application 310 identify an image capture profile associated with the location 335. As noted above, the image capture profile can be a file or list which can be used by the controller 320 and/or the image application 310 to modify a mode of operation of the device, such as an image capture mode.

In one embodiment, when identifying an image capture profile associated with the location 335, the controller 320 and/or the image application 310 can access a profile list 390. As shown in FIG. 3, the profile list 390 can include one or more image capture profiles and entries corresponding to each of the image capture profiles. In one embodiment, the profile list 390 can be a lookup table, a database, a list, and/or a file locally or remotely accessible to the controller 320 and/or the image application 310. Additionally, each entry of the profile list 390 can include fields, listing information associated with the image capture profile. The profile list 390 and/or one or more image capture profiles in the profile list 390 can be created and/or updated by the controller 320, the image application 310, and/or a user of the device.

In one embodiment, a detected location 335 can have a single image capture profile associated with the detected location 335. As shown in FIG. 3, if the detected location 335 is Location 1, the controller 320 and/or the image application 310 can determine that Image Capture Profile 1 is associated with Location 1. Because no other image capture profile is associated with Location 1, the controller 320 and/or the image application 310 can select Image Capture Profile 1 to modify a mode of operation of the device with.

In another embodiment, a location 335 can have more than one image capture profile associated with the location 335. As shown in FIG. 3, if the detected location 335 is Location 3, the controller 320 and/or the image application 310 determine that Image Capture Profile 2 and Image Capture Profile 1 are associated with Location 3. If more than one image capture profile is associated with the detected location 335, the controller 320 and/or the image application 310 proceed to determine whether the location 335 is identified to be indoor or outdoor and/or whether a genre of the environment of the location 335 is specified.

For the purposes of this application, an environment of the location 335 corresponds to the surroundings of the location 335. As illustrated in the present embodiment, the image capture component 360 can be utilized to capture an image/video/view of the environment around the device. Based on the captured image/video/view, the controller 320 and/or the image application 310 can determine whether the image/video/view match an indoor or an outdoor environment.

If the captured image/video/view includes walls or enclosures typical of an indoor environment, the controller 320 and/or the image application 310 can determine that the environment of the location is indoors. In another embodiment, if the captured image/video/view includes wide open field or a view of the sky, the controller 320 and/or the image application 310 can determine that the environment of the location is outdoors. In other embodiments, a user can be prompted to specify whether the location 335 is indoors or outdoors, Additionally, the controller 320 and/or the image application 310 can identify a genre of the location 335. The genre can correspond to a classification of the location 335 and/or a type of environment of the location 335. In one embodiment, the genre of the location 335 can be listed as a park, outdoor entertainment, a celebration event, a noisy, and/or an outdoor use. In another embodiment, the genre of the location 335 can be listed as a library, an office, a movie theater, an art gallery, a quiet indoor use, and/or a secure area. The controller 320 and/or the image application 310 can identify the genre using a name of a place associated with the location 335. In another embodiment, a user of the device and/or another device, such as a server can specify the genre of the environment of the location 335, If Location 3 is specified to be indoors and/or the genre of the environment of Location 3 is identified to be an Office, the controller 320 and/or the image application 310 can determine that Image Capture Profile 2 should be selected and used to modify a mode of operation of the device. In another embodiment, if Location 3 is specified to outdoors and/or the genre of the environment of Location 3 is identified to be a Park, the controller 320 and/or the image application 310 can determine that Image Capture Profile 1 should be selected and used to modify a mode of operation of the device.

Figure 4A:
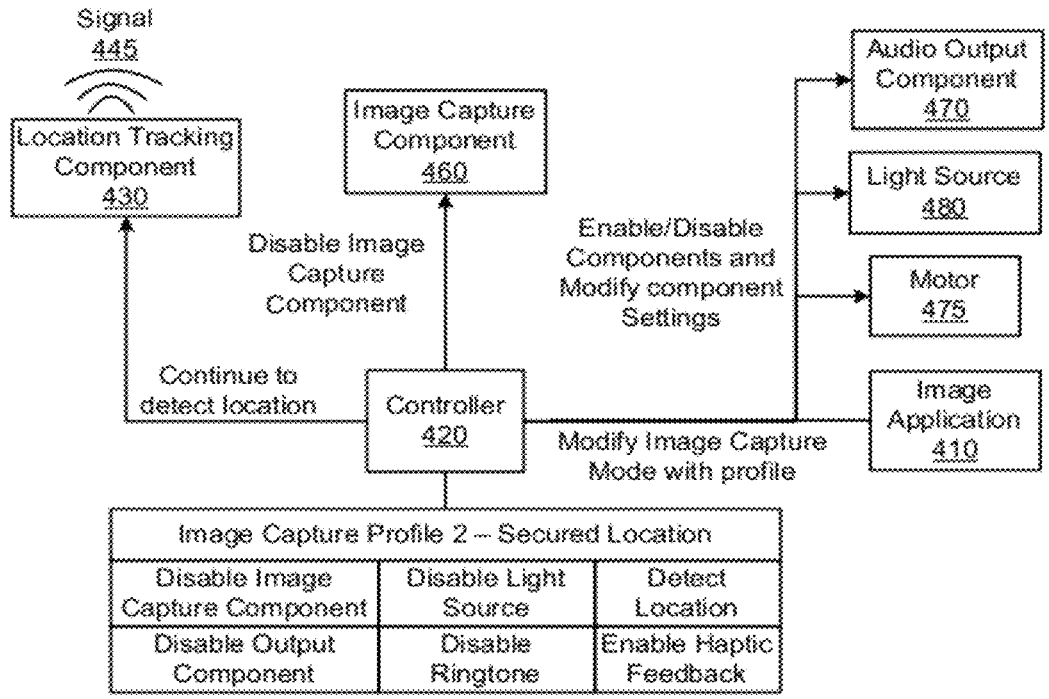
FIG. 4A and FIG. 4B illustrates block diagrams of a mode of operation of a device being modified with an image capture profile according to embodiments.
Figure 4B:
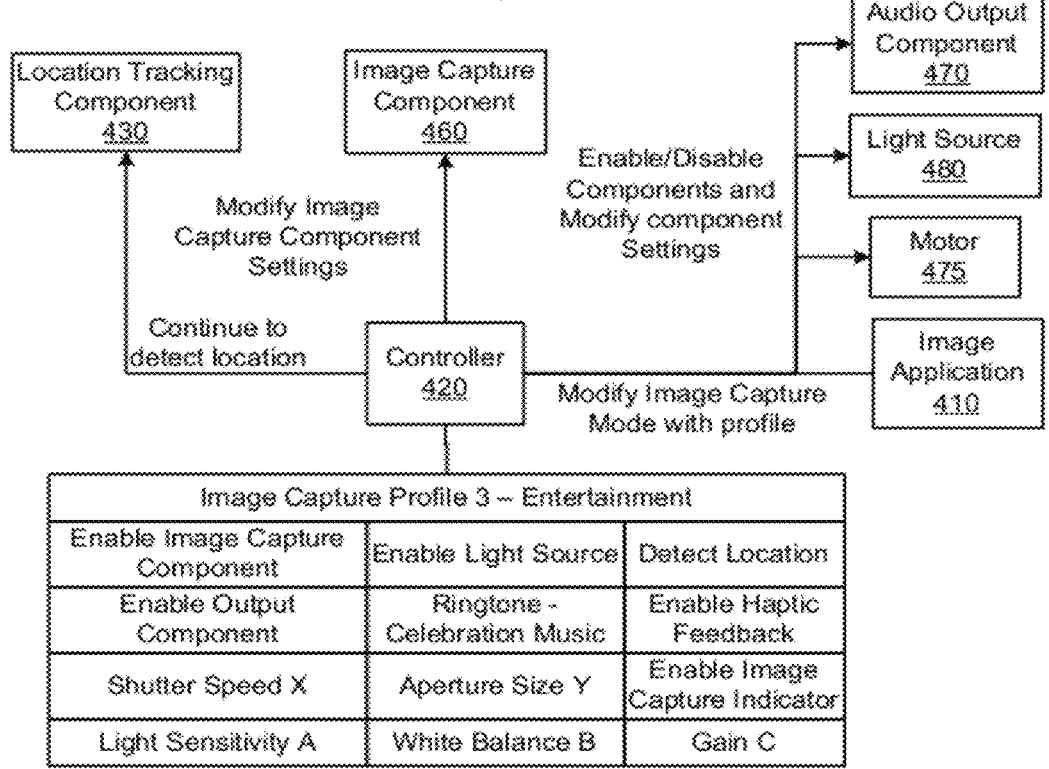

FIG. 4A and FIG. 4B illustrate block diagrams of a mode of operation of a device being modified with an image capture profile according to embodiments. By modifying a mode of operation, such as the image capture mode, the components and/or settings of the device can be modified for different environments and/or conditions based on a location of the device. As noted above, the controller 420 and/or the image application 410 can modify the image capture mode of the device by enabling or disabling one or more components of the device and/or by modifying one or more settings of the components, As shown in FIG. 4A, a component of the device can include the location tracking component 430, the image capture component 460, an audio output component 470, a motor 475, and/or a light source 480. The audio output component 470 is a hardware output component configured to output a ringtone and/or an image capture indicator as audio. The image capture indicator is an audible message indicating when an image has been captured by the image capture component 460. Further, the motor 475 is a hardware component configured to provide a haptic feedback response as a pulse and/or vibration which can be felt by a user the device. Additionally, the light source 480 can be a strobe light and/or any additional light output device which can be utilized by the controller 420 and/or the image application 410 in an image capture mode.

In one embodiment, as shown in FIG. 4A, the controller 420 and/or the image application 410 can select Image Capture Profile 2 to modify the image capture mode of the device with. As shown in FIG. 4A, Image Capture Profile 2 is profile corresponding to a location identified for secured use. A location can have a profile for secured use if an environment of the location is a Library, an Office, a Movie Theater and/or any other location which may not allow images or videos to be captured and/or may prohibit disturbances.

Because the profile is associated with a secured use, Image Capture Profile 2 lists for the image capture component 460 to be disabled, the light source 480 to be disabled, the audio output component 470 to be disabled, and the motor 475 to be enabled. The controller 420 and/or the image application 410 proceed to disable the image capture component 460, disable the audio output component 470, and disable the light source 480. Additionally, the controller 420 and/or the image application 410 proceed to enable the location tracking component 430 and enable to the motor 475. By disabling the image capture component 460, the light source 480, and/or the audio output component 470, the amount of disturbances for the location can be decreased.

In another embodiment, if an image capture profile is associated with an Art Gallery, the image capture profile may list for the image capture component 460 to be enabled, the motor 475 to be enabled, and the location tracking component 430 to be enabled, while the audio output component 470 and the light source 480 are listed to be disabled. Additionally, one or more settings of the image capture component 460, such as a shutter speed, an aperture size, a light sensitivity, a white balance, and/or a gain can be modified to compensate for the light source 480 being disabled. As a result, the device can continue to capture images and/or videos without creating disturbances with the light source 480 and/or the audio output component 470.

In other embodiments, as illustrated in FIG. 4B, the controller 420 and/or the image application 410 can select Image Capture Profile 3 to modify the image capture mode of the device with. Image Capture Profile 3 is listed to be used for Entertainment or Celebrations purposes. As a result, the components and/or settings listed within Image Capture Profile 3 are tailored for capturing images during Entertainment events or for Celebration events when the environment of the location may be noisy, dark, and/or include a high amount of motion from people or objects.

As shown in FIG. 4B, Image Capture Profile 3 lists for the image capture component 460 to be enabled, the light source 480 to be enabled, the location tracking component 430 to be enabled, the audio output component 470 to be enabled, and the motor 475 to be enabled. Additionally, Image Capture Profile 3 lists for settings of the image capture component 460 and the audio output component 470 to be modified. For the image capture component 460, the Shutter Speed value is X, the Aperture Size value is Y, the Light Sensitivity value is A, the White Balance value is B, and the Gain value is C. Further, for the audio output component 470, the Image Capture Indicator is listed to be enabled and a customized ringtone (Celebration Music) is listed for the device.

The controller 420 and/or the image application 410 proceed to enable the listed components and modify the settings of the components as listed within Image Capture Profile 3. In another embodiment, the volume of the audio output component 470 can be additionally increased or decreased if specified within the image capture profile. In other embodiments, the controller 420 and/or the image application 410 can enable and/or disable additional components and/or modify additional settings of components based on an image capture profile in addition to and/or in lieu of those noted above.

Once the components have been enabled or disabled and/or the settings of the components have been modified, the controller 420 and/or the image application 410 can continue to detect location of the device to determine whether the location of the device has changed and/or whether the device has exited the image capture mode. If the location of the device has changed or if the device has exited the image capture mode, the controller 420 and/or the image application can unload the Image Capture Profile 3 and/or load another profile for the device based on a new detected location of the device. Another profile can be a default profile of the device where all of the components of the device are enabled or disabled.

Figure 5:
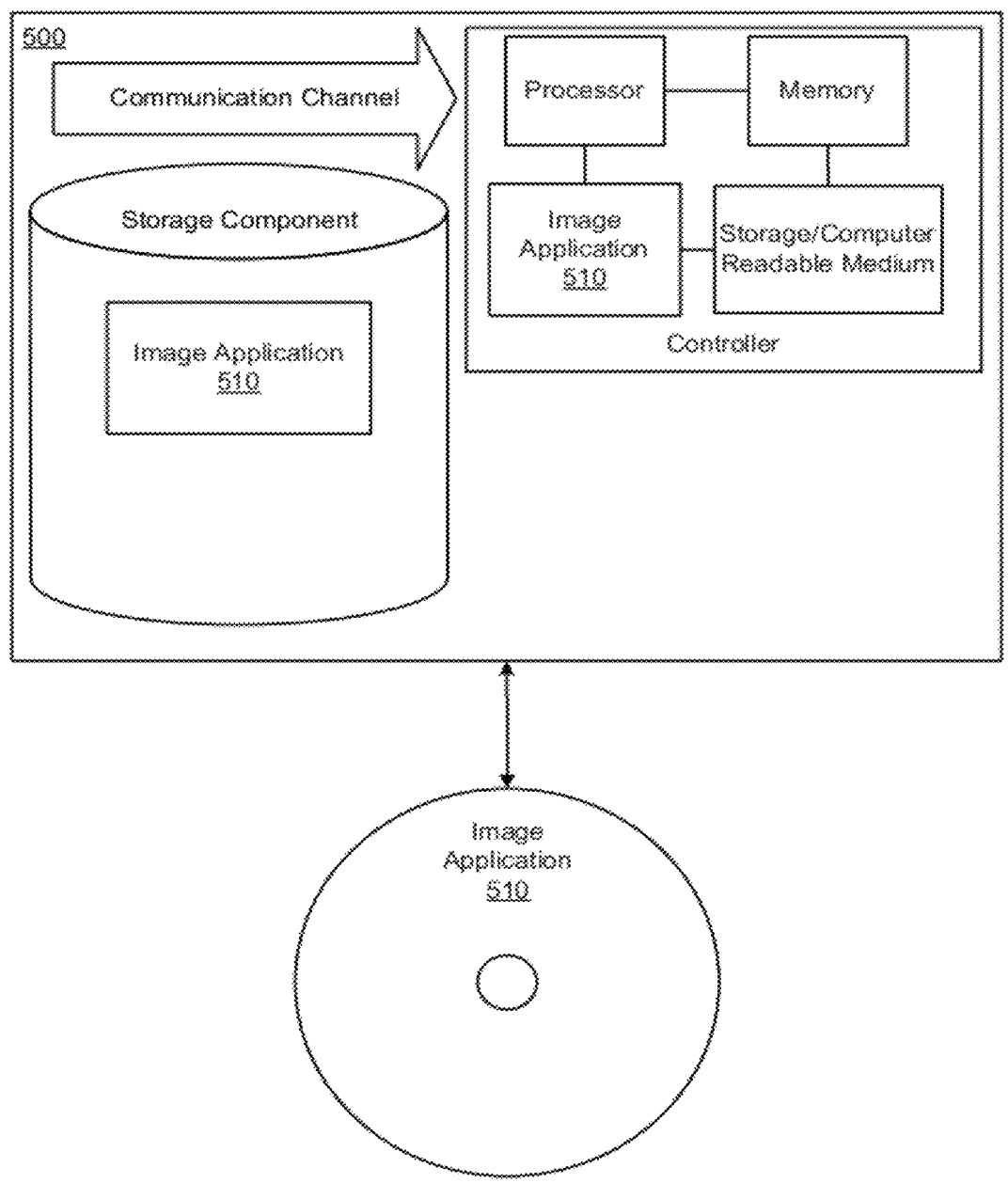
FIG. 5 illustrates an image application on a device and the image application stored on a removable medium being accessed by the device according to an embodiment.

FIG. 5 illustrates an image application 510 on a device 500 and the image application 510 stored on a removable medium being accessed by the device 500 according to an embodiment. For the purposes of this description, a removable medium is any tangible apparatus that contains, stores, communicates, or transports the application for use by or in connection with the device 500. As noted above, in one embodiment, the image application 510 is firmware that is embedded into one or more components of the device 500 as ROM. In other embodiments, the image application 510 is an application which is stored and accessed from a hard drive, a compact disc, a flash disk, a network drive or any other form of computer readable medium that is coupled to the device 500.

Figure 6:
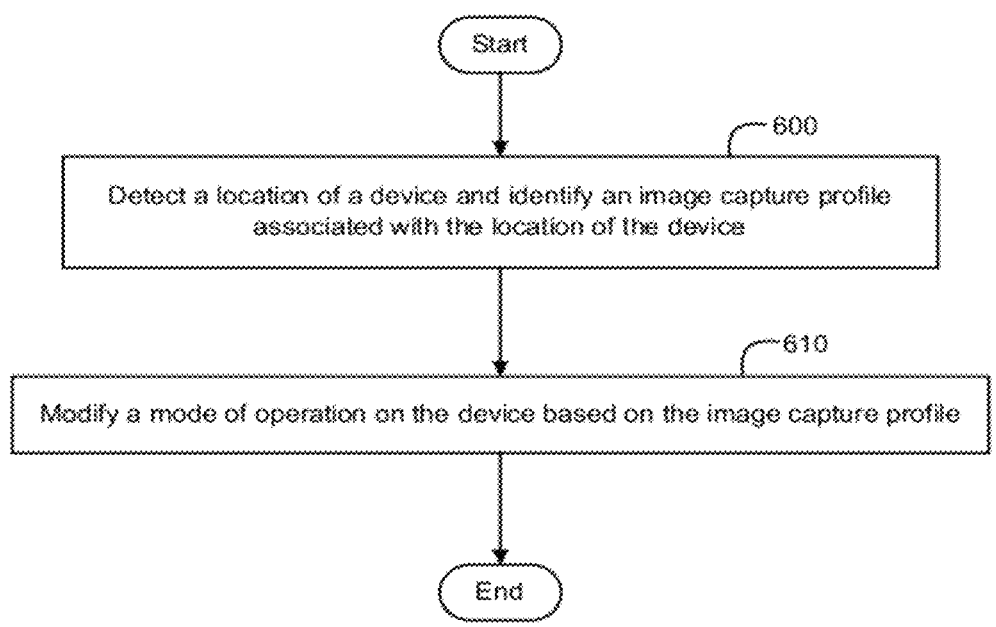
FIG. 6 is a flow chart illustrating a method for managing a device according to an embodiment.

FIG. 6 is a flow chart illustrating a method for managing a device according to an embodiment. The method of FIG. 6 uses a device with a controller, an image capture component, a location tracking component, and/or an image application. In other embodiments, the method of FIG. 6 uses additional components and/or devices in addition to and/or in lieu of those noted above and illustrated in FIGS. 1, 2, 3, 4, and 5.

As noted above, the image application is an application which can be utilized independently and/or in conjunction with the controller to manage the device by modifying a mode of operation of the device. The mode of operation can be an image capture mode. The controller and/or the image application can initially detect a location of the device with a location tracking component and proceed to identify an image capture profile associated with the location of the device 600.

The location tracking component can be a GPS (global positioning system) receiver and/or radio device configured to detect signals from communication devices and pass the signals to the controller and/or the image application as location data. The controller and/or the image application can then triangulate the signals from the location data to detect the location of the device. The controller and/or the image application can then access a local or remote profile list and scan entries of the profile list for the detected location.

In one embodiment, if a single entry includes the detected location, the controller and/or the image application determine to use the corresponding image capture profile included within the entry to modify the mode of operation of the device with. In another embodiment, if more than one entry includes the detected location, the controller and/or the image application can proceed to determine whether the location is indoors or outdoors and/or identify a genre associated with the environment of the location.

The controller and/or the image application can use the image capture component to capture an image/video/view of the environment of the location to determine whether the location is indoors or outdoors. Additionally, the controller and/or the image application can identify a genre of the environment using a name of the location. In another embodiment, the captured image/video/view can be used to identify the genre of the environment. In other embodiments, a user, the controller, the image application, or another device can define whether the location is indoors or outdoors and/or identify the genre of the environment.

Based on the detected location of the device, whether the location is indoors or outdoors, and/or the genre of the environment of the location, the controller and/or the image application can proceed to select an image capture profile to use to modify a mode of operation of the device with 610. As noted above, an image capture mode of the device can be the mode of operation. The device is in an image capture mode if an image capture component of the device is enabled and/or if an application which utilizes the image capture component is launched by the controller and/or the image application.

The image capture profile can be a list or file which specifies which components of the device are enabled or disabled in the image capture mode. Additionally, the image capture profile can list one or more settings or values to be used for the components of the device. Based on the image capture profile, the components of the device can be modified as the device is used in the image capture mode in different locations and/or different environments. The method is then complete. In other embodiments, the method of FIG. 6 includes additional steps in addition to and/or in lieu of those depicted in FIG. 6.

Figure 7:
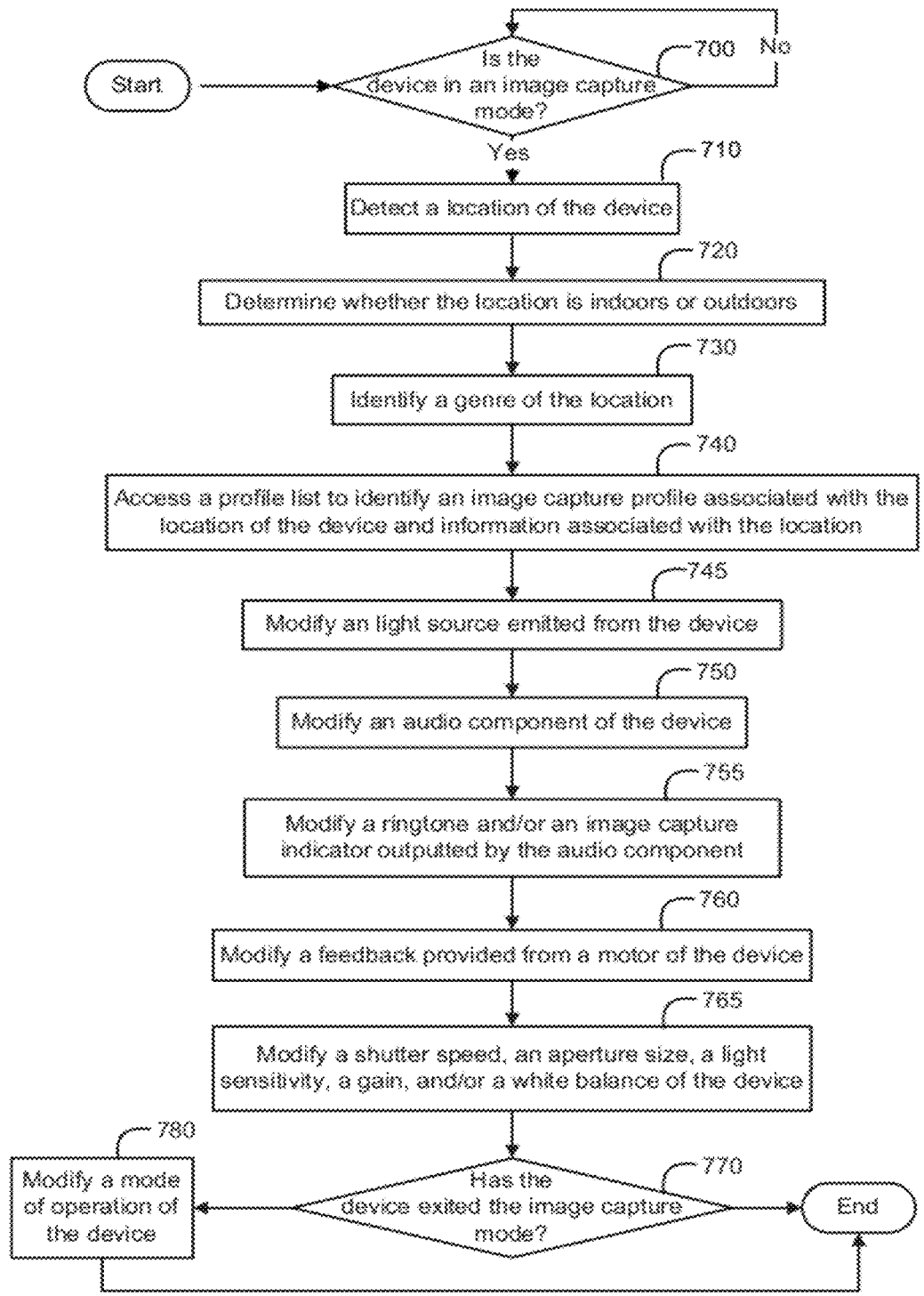
FIG. 7 is a flow chart illustrating a method for managing a device according to an embodiment.

FIG. 7 is a flow chart illustrating a method for managing a device according to another embodiment. Similar to the method disclosed above, the method of FIG. 7 uses a device with a controller, an image capture component, a location tracking component, and/or an image application. In other embodiments, the method of FIG. 7 uses additional components and/or devices in addition to and/or in lieu of those noted above and illustrated in FIGS. 1, 2, 3, 4, and 5.

The controller and/or the image application can initially detect whether the device is in an image capture mode 700. The controller and/or the image application can determine whether the image capture component is enabled and/or whether an application which utilizes the image capture component is launched. If the device is not in the image capture mode, the controller and/or the image capture component continue to detect for the image capture component enabling and/or an application launching which utilizes the image capture component 700.

If the device is in the image capture mode, the controller and/or the image application proceed to detect the location of the device using location data from a location tracking component 710. Additionally, the controller and/or the image application can determine whether the location is indoors or outdoors by prompting a user to specify whether the location is indoors or outdoors and/or by capturing an image/video/view of an environment around the location 720.

In response to determining whether the location is indoors or outdoors, the controller and/or the image application can additionally use a name of the location or environment to identify a genre of the environment of the location 730. The controller and/or the image application can then identify an image capture profile based on the location of the device, whether the location is indoors and/or outdoors, and/or the genre of the environment of the location 740.

Using the image capture profile, the controller and/or the image application can enable and/or disable one or more components of the device. Additionally, the controller and/or the image application can modify one or more settings of the components. The controller and/or the image application can modify a light source of the device by enabling or disabling the light source 745. Additionally, the controller and/or the image application can modify an audio output component of the device by enabling, disabling, and/or modifying one or more settings of the audio output component 750. Further, a ringtone of device can he selected, an image capture indicator can be enabled or disabled, and/or a volume of the audio output component can be modified 755. Once the audio output component has been modified, the controller and/or the image application can modify a haptic feedback response provided to a user of the device by enabling or disabling a motor of the device 760.

Further, the controller and/or the image application can modify one or more settings of the image capture component, such as a shutter speed, an aperture size, a light sensitivity, a gain, and/or a white balance of the image capture component 765. By modifying one or more components and their corresponding settings based on the image capture profile, the device can be configured for different uses based on the location of the device and/or an environment of the location. The controller and/or the image application can then determine whether the device has exited the image capture mode and/or whether the location of the device has changed 770.

If the device remains at the same location and/or if the device remains in the image capture mode, the component and/or settings of the components are not changed and the method is then complete. In another embodiment, if the location of the device changes and/or the device exits the image capture mode, the controller and/or the image application can modify the mode of operation of the device by unloading the image capture profile or by loading another profile for the device. In other embodiments, the method of FIG. 7 includes additional steps in addition to and/or in lieu of those depicted in FIG. 7.

What is claimed is:

1. A method for managing a device comprising:
    detecting a location of a device and identifying an image capture profile associated with the location of the device, the image capture profile having fields listing device settings tailored to capture an image based on the detected location; and
    modifying a mode of operation on the device based on the image capture profile.

2. The method for managing a device of claim 1 wherein modifying a mode of operation includes modifying an image capture mode of the device according to a genre identified by a name of a place associated with the location of the device.

3. The method for managing a device of claim 1 wherein detecting the location of the device includes polling a location tracking component for location, data and using a signal from the location data to triangulate the location of the device.

4. The method for managing a device of claim 1 further comprising capturing a view of an environment of the location to determine whether the location is indoors or outdoors.

5. The method for managing a device of claim 4 further comprising identifying a genre associated with at least one of the location of the device and the environment of the location.

6. The method for managing a device of claim 5 wherein at least one of the environment of the location and the genre are used to identify the image capture profile associated with the location.

7. The method for managing a device of claim 1 wherein modifying the mode of operation includes, when the location of the device is a secured area or a quiet area, at least one of disabling the audio component of the device, and modifying a volume of the audio output component of the device.

8. The method for managing a device of claim 1 wherein modifying the mode of operation includes, when the location of the device is a secured area or a no use area, disabling a light source of the device so that no images or vides can be captured for security reasons.

9. The method for managing a device of claim 1 wherein modifying the mode of operation includes modifying at least one of a shutter speed of the device, an aperture size of the device, a light sensitivity of the device, a gain of the device, a white balance of the device.

10. A device comprising:
    an image capture component;
    a location tracking component to detect location data of the device; and
    a controller to detect the location of the device with the location data if the device is in an image capture mode and modify a mode of operation of the device with the image capture profile associated with the location of the device, the image capture profile having fields listing device settings tailored to capture an image based on the detected location.

11. The device of claim 10 further comprising a profile list including entries, wherein each entry lists an image capture profile and a corresponding location associated with the image capture profile.

12. The device of claim 11 wherein the profile list is stored as at least one of a lookup table, a database, and a file.

13. The device of claim 10 further comprising an audio output component to output at least one of a ringtone and an image capture indicator based on the image capture profile.

14. The device of claim 13 wherein the controller modifies a volume of the audio output component based on the image capture profile.

15. The device of claim 10 further comprising a motor to provide a haptic feedback response for the device based on the image capture profile.

16. A computer readable medium comprising instructions that if executed cause a controller to:
    detect a location of a device if the device is in an image capture mode;
    identify an image capture profile for the device associated with the location of the device, the image capture profile having fields listing device settings tailored to capture an image based on the detected location; and
    modify a mode of operation on the device based on the image capture profile.

17. The computer readable medium comprising instructions of claim 16 wherein modifying the mode of operation includes the controller disabling at least one component of the device when the location is a secured area.

18. The computer readable medium comprising instructions of claim 16 wherein the controller modifies the mode of operation of the device with a second profile in response to the device exiting the image capture mode.

19. The computer readable medium comprising instructions of claim 16 further causing the controller to identify a genre associated with at least one of the location of the device, the genre including a classification of the location.

20. The computer readable medium comprising instructions of claim 16 wherein the image capture profile lists the genre at least one of a park, outdoor entertainment, a celebration event, a noisy use, an outdoor use, a library, an office, a movie theater, an art gallery, a quiet indoor use and a secure area.

* * * * *

UNITED STATES PATENT AND TRADEMARK OFFICE
CERTIFICATE OF CORRECTION

PATENT NO. : 8,559,973 B2
APPLICATION NO. : 13/151005
DATED : October 15, 2013
INVENTOR(S) : Robert P Cazier et al.

It is certified that error appears in the above-identified patent and that said Letters Patent is hereby corrected as shown below:

In the Claims:

In column 9, line 47, in Claim 3, delete "location," and insert -- location --, therefor.

In column 10, line 2, in Claim 8, delete "vides" and insert -- videos --, therefor.

In column 10, line 63, in Claim 20, delete "use" and insert -- use, --, therefor.

Signed and Sealed this
Twentieth Day of May, 2014

Michelle K. Lee
*Deputy Director of the United States Patent and Trademark Office*